(12) United States Patent
Hikita et al.

(10) Patent No.: US 9,844,759 B2
(45) Date of Patent: Dec. 19, 2017

(54) POLYMER COMPOSITION AND POROUS MEMBRANE

(71) Applicant: Mitsubishi Rayon Co., Ltd., Chiyoda-ku (JP)

(72) Inventors: Shingo Hikita, Otake (JP); Tetsuya Noda, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 31 days.

(21) Appl. No.: 14/652,506

(22) PCT Filed: Dec. 20, 2013

(86) PCT No.: PCT/JP2013/084318
§ 371 (c)(1),
(2) Date: Jun. 16, 2015

(87) PCT Pub. No.: WO2014/098234
PCT Pub. Date: Jun. 26, 2014

(65) Prior Publication Data
US 2015/0343392 A1    Dec. 3, 2015

(30) Foreign Application Priority Data

Dec. 20, 2012  (JP) ................................ 2012-278592
Feb. 19, 2013  (JP) ................................ 2013-029966

(51) Int. Cl.
| | | |
|---|---|---|
| B01D 71/34 | (2006.01) | |
| C08L 27/16 | (2006.01) | |
| B01D 71/80 | (2006.01) | |
| C08J 9/00 | (2006.01) | |
| B01D 61/14 | (2006.01) | |
| B01D 67/00 | (2006.01) | |
| B01D 69/02 | (2006.01) | |
| C08F 290/04 | (2006.01) | |
| H01M 10/0565 | (2010.01) | |
| C08J 5/18 | (2006.01) | |
| C02F 1/44 | (2006.01) | |

(Continued)

(52) U.S. Cl.
CPC ........... *B01D 71/80* (2013.01); *B01D 61/145* (2013.01); *B01D 67/0006* (2013.01); *B01D 69/02* (2013.01); *B01D 69/08* (2013.01); *B01D 71/32* (2013.01); *B01D 71/34* (2013.01); *B01D 71/40* (2013.01); *C02F 1/444* (2013.01); *C08F 290/04* (2013.01); *C08J 5/18* (2013.01); *C08J 9/0061* (2013.01); *C08J 9/28* (2013.01); *C08L 27/16* (2013.01); *C08L 55/00* (2013.01); *C08L 101/00* (2013.01); *C09D 127/16* (2013.01); *H01M 2/1653* (2013.01); *H01M 10/0525* (2013.01); *H01M 10/0565* (2013.01); *B01D 61/14* (2013.01); *B01D 2323/02* (2013.01); *B01D 2325/02* (2013.01); *B01D 2325/36* (2013.01); *C08J 2201/0544* (2013.01); *C08J 2205/042* (2013.01); *C08J 2327/16* (2013.01); *C08J 2451/00* (2013.01); *H01M 2300/0085* (2013.01)

(58) Field of Classification Search
USPC .......................................... 521/134; 526/220
See application file for complete search history.

(56) References Cited

U.S. PATENT DOCUMENTS

| | | | |
|---|---|---|---|
| 4,680,352 A | | 7/1987 | Janowicz et al. |
| 5,147,952 A | * | 9/1992 | Mori ..................... C08F 299/00 526/217 |
| 2003/0125488 A1 | * | 7/2003 | Nakahara .............. C08F 265/04 526/172 |

FOREIGN PATENT DOCUMENTS

| | | |
|---|---|---|
| EP | 0196783 A1 | 10/1986 |
| EP | 2662394 A1 * | 11/2013 |

(Continued)

OTHER PUBLICATIONS

Nunes et al., "Ultrafiltration membranes from PVDF/PMMA blends", Journal of Membrane Science, Elsevier BV, NL, vol. 73, No. 1, pp. 25-35, Oct. 2, 1992.*

(Continued)

*Primary Examiner* — Mark Kaucher
*Assistant Examiner* — Henry Hu
(74) *Attorney, Agent, or Firm* — Morgan, Lewis & Bockius LLP

(57) ABSTRACT

A polymer composition containing a polymer (B) obtained by polymerizing a monomer composition containing: a methacrylic acid ester macromonomer (b1) represented by the following formula (1); and another monomer (b2). Also, a porous membrane formed from a membrane forming polymer (A) and the aforementioned polymer composition.

[Chem. 1]

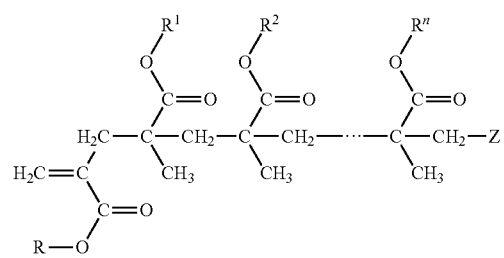

(1)

15 Claims, No Drawings

(51) Int. Cl.
*B01D 69/08* (2006.01)
*H01M 2/16* (2006.01)
*H01M 10/0525* (2010.01)
*C09D 127/16* (2006.01)
*B01D 71/40* (2006.01)
*C08J 9/28* (2006.01)
*C08L 55/00* (2006.01)
*C08L 101/00* (2006.01)
*B01D 71/32* (2006.01)

(56) References Cited

FOREIGN PATENT DOCUMENTS

| JP | 60-133007 A | 7/1985 |
|---|---|---|
| JP | 61-228006 A | 10/1986 |
| JP | 11-240854 A | 9/1999 |
| JP | 2001-500542 A | 1/2001 |
| JP | 2003-055416 A | 2/2003 |
| JP | 2006-160995 A | 6/2006 |
| JP | 2006-205067 A | 8/2006 |
| JP | 2009-079224 A | 4/2009 |
| JP | 2012-506772 A | 3/2012 |
| WO | 88/04304 A1 | 6/1988 |
| WO | 97/35904 A1 | 10/1997 |
| WO | 98/08595 A2 | 3/1998 |
| WO | 03/092873 A1 | 11/2003 |
| WO | WO-03/092873 A1 * | 11/2003 |
| WO | 2010/051150 A1 | 5/2010 |
| WO | WO-2010/051150 A1 * | 5/2010 |
| WO | 2012/093689 A1 | 7/2012 |
| WO | WO-2012/093689 A1 * | 7/2012 |
| WO | 2012/128939 A2 | 9/2012 |

OTHER PUBLICATIONS

International Search Report dated Apr. 1, 2014 for International application No. PCT/JP2013/084318.
Notice of Allowance dated May 26, 2015 for corresponding Japanese application No. 2014-501783.
European Search Report dated Dec. 11, 2015, for corresponding Application No. 13866201.0.
Anonymous: "Poly(methyl methacrylate-co-ethyl acrylate) ethyl acrylate <5 wt. %, average Mn ~ 39,500 by GPC, average Mw ~ 101,000 by GPC, powder, Sigma-Aldrich", Nov. 30, 2015 (retrieved from the internet on Sep. 27, 2017: http://www.sigmaaldrich.com/catalog/product/aldrich/182249?lang=en&region=GB).
Communication Pursuant to Article 94(3) EPC issued in corresponding European Patent Application No. 13 866 201.0, dated Oct. 17, 2017.

* cited by examiner

POLYMER COMPOSITION AND POROUS MEMBRANE

TECHNICAL FIELD

The present invention relates to a polymer composition and a porous membrane.

This application is based upon and claims the benefit of priority of the prior Japanese Patent Application No. 2012-278592, filed in the Japan Patent Office on Dec. 20, 2012, and the prior Japanese Patent Application No. 2013-029966, filed in the Japan Patent Office on Feb. 19, 2013, the entire contents of which are incorporated herein by reference.

BACKGROUND ART

Porous membranes are utilized in various fields such as a water treatment field including drinking water production, water purification treatment, and waste water treatment. In recent years, simplified manufacturing process is desired in addition to the membrane performance such as high fractionation performance or hydrophilicity.

As a porous membrane, a polymer membrane containing a hydrophobic matrix polymer such as polyvinylidene fluoride and an amphiphilic block copolymer has been proposed in Patent Document 1. However, the porous membrane described in Patent Document 1 has a bubble point diameter of about from 122 to 198 nm and thus the fractionation performance thereof cannot be said to be sufficient for an ultrafiltration application. In addition, the block copolymer used in Patent Document 1 is produced by a controlled radical polymerization method such as nitroxide-mediated polymerization (NMP), thus the monomer is required to be removed after the polymerization, and as a result, the porous membrane cannot be said to be cost-effective.

CITATION LIST

Patent Document

Patent Document 1: JP 2012-506,772 W

SUMMARY OF THE INVENTION

Problem to be Solved by the Invention

An object of the invention is to provide a polymer composition and a porous membrane suitable for obtaining a membrane exhibiting favorable fractionation performance and high water permeability by the use of a polymer easily obtained by a usual radical polymerization.

Means for Solving Problem

The above problem is solved by the following inventions [1] to [10].

[1] A polymer composition including a polymer (B) obtained by polymerizing a monomer composition containing a methacrylic acid ester macromonomer (b1) represented by the following Formula (1) (hereinafter, referred to as macromonomer (b1)) and another monomer (b2).

[Chem. 1]

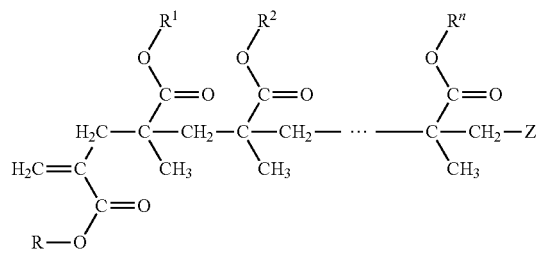

In Formula (1), R and $R^1$ to $R^n$ each independently represent a hydrogen atom, an alkyl group, a cycloalkyl group, an aryl group or a heterocyclic group, Z is a terminal group, and n is an integer from 2 to 10,000.

[2] The polymer composition according to [1], further including a membrane forming polymer (A).

[3] The polymer composition according to [2], in which the membrane forming polymer (A) is a fluorine-containing polymer.

[4] The polymer composition according to any one of [1] to [3], in which the other monomer (b2) is (meth)acrylic acid or a (meth)acrylate.

[5] The polymer composition according to any one of [1] to [4], in which a contact angle of pure water on an outer surface of a porous membrane formed from the polymer composition is 75° or less.

[6] A porous membrane formed from a resin composition containing:

a membrane forming polymer (A); and a polymer (B) obtained by polymerizing a monomer composition containing a methacrylic acid ester macromonomer (b1) represented by the following Formula (1) and another monomer (b2).

[Chem. 2]

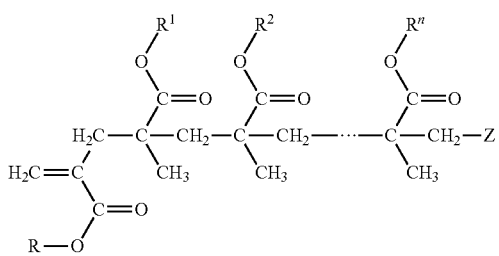

In Formula (1), R and $R^1$ to $R^n$ each independently represent a hydrogen atom, an alkyl group, a cycloalkyl group, an aryl group or a heterocyclic group, Z is a terminal group, and n is an integer from 2 to 10,000.

[7] The porous membrane according to [6], in which the membrane forming polymer (A) is a fluorine-containing polymer.

[8] The porous membrane according to [6] or [7], in which a contact angle of pure water on an outer surface of the porous membrane is 75° or less.

[9] The porous membrane according to any one of [6] to [8], in which the porous membrane includes pores having an average pore size of 500 nm or less.

[10] The porous membrane according to any one of [6] to [8], in which the porous membrane includes pores having an average pore size of 120 nm or less.

Effect of the Invention

According to the invention, it is possible to obtain a polymer composition and a porous membrane suitable for obtaining a membrane exhibiting favorable fractionation performance and high water permeability by using a polymer easily obtained by a usual radical polymerization.

In addition, the polymer composition and the porous membrane of the invention exhibit the above performance, and thus the application thereof is not limited to the water treatment field but they are suitable for a support of an electrolyte solution, in particular, for a support that is swollen with a lithium ion electrolyte solution in a lithium ion battery.

MODE(S) FOR CARRYING OUT THE INVENTION

Membrane Forming Polymer (A)

A membrane forming polymer (A) may be contained in the polymer composition according to the first aspect of the invention and is one of the constituents of the porous membrane according to the second aspect of the invention.

The membrane forming polymer (A) is used for maintaining the structure of the polymer composition and the porous membrane of the invention, and the composition of the membrane forming polymer (A) can be selected according to the properties required to the polymer composition and the porous membrane.

In a case in which chemical resistance, oxidative deterioration resistance, and heat resistance are required, examples of the membrane forming polymer (A) may include a fluorine-containing polymer such as polyvinylidene fluoride (PVDF), PVDF-co-hexafluoropropylene (HFP), ethylene-co-chlorotrifluoroethylene (ECTFE), polyvinyl fluoride, or polytetrafluoroethylene (PTFE), polyvinyl chloride (PVC), polyethylene, polypropylene, polystyrene, a polystyrene derivative, a polyamide, a polyurethane, a polycarbonate, a polysulfone, a polyethersulfone, and cellulose acetate. Among these, a fluorine-containing polymer such as polyvinylidene fluoride (PVDF), PVDF-co-hexafluoropropylene (HFP), ethylene-co-chlorotrifluoroethylene (ECTFE), polyvinyl fluoride, or polytetrafluoroethylene (PTFE) is preferred from the viewpoint of chemical resistance and oxidative deterioration resistance of the polymer composition and the porous membrane. Among these, PVDF is preferred from the viewpoint of oxidative deterioration resistance and mechanical durability of the polymer composition and the porous membrane.

The membrane forming polymer (A) can be used singly or in combination of two or more kinds thereof.

The membrane forming polymer (A) is preferably a polymer that is soluble in a solvent (C2) to be described later and does not dissolve in pure water.

Among the polymers described above, PVDF is preferred from the viewpoint of compatibility with a polymer (B) and the solvent (C2) to be described later, chemical resistance, and heat resistance.

The mass average molecular weight (hereinafter, referred to as "Mw") of the membrane forming polymer (A) is preferably from 100,000 to 2,000,000. The mechanical strength of the polymer composition and the porous membrane of the invention tends to be favorable when the Mw is 100,000 or more, and the solubility in the solvent (C2) tends to be favorable when the Mw is 2,000,000 or less. The Mw is more preferably 300,000 or more, and the Mw is more preferably 1,500,000 or less. More specifically, the mass average molecular weight of the membrane forming polymer (A) is more preferably from 300,000 to 1,500,000, even more preferably from 400,000 to 1,000,000, and particularly preferably from 500,000 to 700,000.

Incidentally, in the present specification, the Mw adopts the mass average molecular weight in terms of polystyrene by GPC (gel permeation chromatography).

Incidentally, in the case of using those which have the Mw described above as the membrane forming polymer (A), it is possible to mix those having different Mw to be used as the membrane forming polymer (A) having a predetermined Mw.

<Macromonomer (b1)>

The macromonomer (b1) is one of the constituents of the polymer (B) contained in the polymer composition and the porous membrane of the invention.

The macromonomer (b1) is a monomer represented by Formula (1) and is one in which a radically polymerizable group having an unsaturated double bond is added at one terminal of the polymethacrylic acid ester segment. In Formula (1), the notation " . . . " indicates a state in which the monomer unit is polymerized.

Incidentally, in the present specification, the "monomer" means a compound having a radically polymerizable group.

Specific examples of the radically polymerizable group may include a group having a double bond.

In Formula (1), R and $R^1$ to $R''$ each independently represent a hydrogen atom, an alkyl group, a cycloalkyl group, an aryl group or a heterocyclic group. An alkyl group, a cycloalkyl group, an aryl group or a heterocyclic group can have a substituent.

Examples of the alkyl group for R or $R^1$ to $R''$ may include a branched or linear alkyl group having from 1 to 20 carbon atoms. Specific examples of the alkyl group for R or $R^1$ to $R''$ may include a methyl group, an ethyl group, a n-propyl group, an iso-propyl group, a n-butyl group, an isobutyl group, a t-butyl group, an isoamyl group, a hexyl group, an octyl group, a lauryl group, a dodecyl group, a stearyl group, and a 2-ethylhexyl group. Specific examples in a case in which the alkyl group for R or $R^1$ to $R''$ has a substituent may include a benzyl group, a 2-hydroxyethyl group, a 2-hydroxypropyl group, a 2-hydroxybutyl group, a 3-hydroxybutyl group, a 4-hydroxybutyl group, a polyethylene glycol group, a polypropylene glycol group, a methoxyethyl group, an ethoxyethyl group, a n-butoxyethyl group, an iso-butoxyethyl group, a t-butoxyethyl group, a phenoxyethyl group, a nonylphenoxyethyl group, a 3-methoxybutyl group, a methoxy-diethylene glycol group, a methoxy-tetraethylene glycol group, a methoxy-nonaethylene glycol group, an octoxy-octaethylene glycol-hexapropylene glycol group, and a nonylphenoxy(ethylene glycol-polypropylene glycol) group.

Examples of the cycloalkyl group for R or $R^1$ to $R''$ may include a cycloalkyl group having from 3 to 20 carbon atoms. Specific examples of the cycloalkyl group for R or $R^1$ to $R''$ may include a cyclopropyl group, a cyclobutyl group, and an adamantyl group.

Examples of the aryl group for R or $R^1$ to $R''$ may include an aryl group having from 6 to 18 carbon atoms. Specific examples of the aryl group for R or $R^1$ to $R''$ may include a phenyl group and a naphthyl group.

Examples of the heterocyclic group for R or $R^1$ to $R''$ may include a heterocyclic group having from 5 to 18 carbon atoms. Specific examples of the heterocyclic group for R or $R^1$ to $R''$ may include a glycidyl group, a γ-lactone group and an ε-caprolactone group. Examples of the heteroatom contained in the heterocyclic ring may include an oxygen atom, a nitrogen atom, and a sulfur atom.

Examples of the substituent for R or $R^1$ to $R''$ may each independently include a group selected from the group consisting of an alkyl group, an aryl group, a carboxyl group, an alkoxycarbonyl group (—COOR'), a carbamoyl (—CONR'R'') group, a cyano group, a hydroxyl group, an amino group, an amide group (—C(=O)NR'R''), a halogen, an allyl group, an epoxy group, an alkoxy group (—OR') and a group exhibiting hydrophilicity or ionicity. Incidentally, examples of R' or R'' may each independently include the same groups as those for R except the heterocyclic group. Incidentally, the number of carbon atoms of the substituent is not included in the number of carbon atoms of R or $R^1$ to $R''$.

Examples of the alkoxycarbonyl group of the substituent for R or $R^1$ to $R''$ may include a methoxycarbonyl group.

Examples of the carbamoyl group of the substituent for R or $R^1$ to $R''$ may include a N-methylcarbamoyl group and a N,N-dimethylcarbamoyl group.

Examples of the amide group of the substituent for R or $R^1$ to $R''$ may include a dimethyl amide group.

Examples of the halogen of the substituent for R or $R^1$ to $R''$ may include fluorine, chlorine, bromine and iodine.

Examples of the alkoxy group of the substituent for R or $R^1$ to $R''$ may include an alkoxy group having from 1 to 12 carbon atoms, and specific examples thereof may include a methoxy group, an ethoxy group, a n-butoxy group, an iso-butoxy group, a t-butoxy group, a phenoxy group, and a nonylphenoxy group.

Examples of the group exhibiting hydrophilicity or ionicity of the substituent for R or $R^1$ to $R''$ may include an alkali salt of a carboxyl group or an alkali salt of a sulfo group, a poly(alkylene oxide) group such as a polyethylene oxide group or a polypropylene oxide group, and a cationic substituent such as a quaternary ammonium salt group. Specific examples of the poly(alkylene oxide) group may include a polyethylene oxide group such as a diethylene oxide group, a triethylene oxide group, a tetraethylene oxide group, a pentaethylene oxide group, a hexaethylene oxide group, a heptaethylene oxide group, or an octaethylene oxide group; a polypropylene oxide group such as dipropylene oxide group, a tripropylene oxide group, a tetrapropylene oxide group, a pentapropylene oxide group, a hexapropylene oxide group, a heptapropylene oxide group, an octapropylene oxide group, or a hexapropylene oxide group; and a combination of a polyethylene oxide group and a polypropylene oxide group. These groups may be interposed between $R^1$ to $R''$ and the oxygen atom (—O—) bonded thereto.

R is preferably a methyl group, an ethyl group, a n-propyl group or an iso-propyl group and more preferably a methyl group from the viewpoint of easy availability of the macromonomer (b1) and handling properties and the balance in mechanical properties of the polymer (B) to be obtained.

$R^1$ to $R''$ are preferably a methyl group, an ethyl group, an n-propyl group or an iso-propyl group and more preferably a methyl group.

Z is a terminal group of the macromonomer (b1). Examples of the terminal group of the macromonomer (b1) may include a group derived from a hydrogen atom and a radical polymerization initiator as the terminal group of the polymer obtained by a known radical polymerization.

n represents the number of moles of the monomer unit (provided that, the number of the monomer unit having a double bond is excluded) contained in one molecule of the macromonomer (b1). n in "$R''$" means the same number. In other words, 1 to n of $R^1$ to $R''$ ($R^1, R^2, R^3 \ldots R''$) are present so as to correspond to the number of the monomer unit (provided that, the number of the monomer unit having a double bond is excluded) constituting the macromonomer (b1). n is an integer from 2 to 10,000. n is preferably from 10 to 1000 and more preferably from 30 to 500.

The macromonomer (b1) has an effect to act as a chain transfer agent at the time of radically polymerizing a monomer mixture containing the macromonomer (b1). Hence, it is possible to obtain the polymer (B) having at least one kind selected from a block copolymer or a graft copolymer without using a metal catalyst or a sulfur compound when a monomer composition containing the macromonomer (b1) and the other monomer (b2) to be described later is radically polymerized, and thus the polymer (B) to be obtained is suitable for a molded product required to have a low content of impurities such as a metal.

In addition, it is possible to obtain a polymerized product containing a block copolymer at relatively lower cost than the controlled radical polymerization of the related art by the use of the macromonomer (b1). Incidentally, examples of the controlled radical polymerization may include a reversible addition-fragmentation chain transfer polymerization (RAFT), atom transfer radical polymerization (ATRP), and nitroxide mediated polymerization (NMP). These controlled radical polymerizations are characterized by having a controlled molecular weight and a narrow molecular weight distribution.

In the invention, the macromonomer refers to a high molecular compound having a polymerizable functional group and is also called a macromer in another name.

Examples of the radically polymerizable monomer to be a raw material for constituting the polymethacrylic acid ester segment in the macromonomer (b1) may include, from the viewpoint of the balance in mechanical properties of the polymer (B), methyl methacrylate, ethyl methacrylate, n-propyl methacrylate, isopropyl methacrylate, n-butyl methacrylate, isobutyl methacrylate, t-butyl methacrylate, isoamyl methacrylate, hexyl methacrylate, octyl methacrylate, lauryl methacrylate, dodecyl methacrylate, stearyl methacrylate, phenyl methacrylate, benzyl methacrylate, glycidyl methacrylate, 2-ethylhexyl methacrylate, 2-hydroxyethyl methacrylate, 2-hydroxypropyl methacrylate, 2-hydroxybutyl methacrylate, 3-hydroxybutyl methacrylate, 4-hydroxybutyl methacrylate, polyethylene glycol methacrylate, polypropylene glycol methacrylate, PLACCEL FM (trade name, manufactured by Daicel Corporation, caprolactone-added monomer), methoxyethyl methacrylate, ethoxyethyl methacrylate, n-butoxyethyl methacrylate, isobutoxyethyl methacrylate, t-butoxyethyl methacrylate, phenoxyethyl methacrylate, nonylphenoxyethyl methacrylate, 3-methoxybutyl methacrylate, BLEMMER PME-100 (trade name, manufactured by NOF CORPORATION, methoxy polyethylene glycol methacrylate (one having two chains of ethylene glycol: methoxy diethylene glycol methacrylate)), BLEMMER PME-200 (trade name, manufactured by NOF CORPORATION, methoxy polyethylene glycol methacrylate (one having four chains of ethylene glycol: methoxy tetraethylene glycol methacrylate)), BLEMMER PME-400 (trade name, manufactured by NOF CORPORATION, methoxy polyethylene glycol methacrylate (one having nine chains of ethylene glycol: methoxy nonaethylene glycol methacrylate)), BLEMMER 50POEP-800B (trade name, manufactured by NOF CORPORATION, octoxypolyethylene glycol-polypropylene glycol-methacrylate (one having eight chains of ethylene glycol and six chains of propylene glycol: octoxy-octaethylene glycol-hexapropylene glycol-methacrylate)), and BLENMER 20ANEP-600 (trade name, manufactured by NOF CORPORATION, nonylphenoxy (ethylene glycol-polypropylene glycol)monoacrylate). These can be used singly or in combination of two or more kinds thereof.

Among these, methyl methacrylate, n-butyl methacrylate, lauryl methacrylate, dodecyl methacrylate, stearyl methacrylate, 2-ethylhexyl methacrylate, glycidyl methacrylate, 2-hydroxyethyl methacrylate, 4-hydroxybutyl methacrylate, methacrylic acid, BLEMMER PME-100, BLEMMER PME-200, and BLEMMER PME-400 are preferred from the viewpoint of easy availability of a radically polymerizable monomer to be a raw material and the balance in mechanical properties of the polymer (B) to be obtained. In addition, as the radically polymerizable monomer to be a raw material, methyl methacrylate, n-butyl methacrylate, lauryl methacrylate, dodecyl methacrylate, 2-ethylhexyl methacrylate, 2-hydroxyethyl methacrylate, BLEMMER PME-100, BLEMMER PME-200, and BLEMMER PME-400 are more preferred and methyl methacrylate is even more preferred from the viewpoint of favorable compatibility with the membrane forming polymer (A), in particular PVDF.

The number average molecular weight (hereinafter, referred to as "Mn") of the macromonomer (b1) is preferably from 1,000 to 1,000,000 from the viewpoint of the balance in mechanical properties of the polymer (B) to be obtained. The Mn is more preferably 3,000 or more and even more preferably 4,000 or more. The Mn is more preferably 60,000 or less and even more preferably 50,000 or less. More specifically, the number average molecular weight of the macromonomer (b1) is preferably from 3,000 to 60,000, more preferably from 4,000 to 50,000, even more preferably from 5,000 to 40,000, and particularly preferably from 8,000 to 38,000.

The molecular weight distribution (hereinafter, referred to as "Mw/Mn") of the macromonomer (b1) is preferably 1.5 or more and 5.0 or less, more preferably from 1.8 to 3.0, and particularly preferably from 1.9 to 2.5 from the viewpoint of the balance in mechanical properties of the polymer (B) to be obtained.

The proportion of the macromonomer (b1) unit to the entire monomer units constituting the polymer (B) is preferably from 10 to 90% by mole and preferably from 20 to 80% by mole.

The proportion of the other monomer (b2) unit to the entire monomer units constituting the polymer (B) is preferably from 90 to 10% by mole and preferably from 80 to 20% by mole.

The "monomer unit" means the monomer unit (monomer units) constituting the polymer. The "entire monomer units constituting the polymer (B)" means the sum of the number of moles of the "macromonomer (b1) unit" and the number of moles of the "other monomer (b2) unit".

In the invention, the macromonomer (b1) can be used singly or in combination of two or more kinds thereof.

Examples of the production method of the macromonomer (b1) may include a method to produce the macromonomer (b1) using a cobalt chain transfer agent (for example, U.S. Pat. No. 4,680,352), a method using an α-substituted unsaturated compound such as α-bromomethylstyrene as a chain transfer agent (for example, WO 88/04,304 A), a method to chemically bond a polymerizable group (for example, JP 60-133,007 A, U.S. Pat. No. 5,147,952), and a method utilizing thermal decomposition (for example, JP 11-240,854 A). Among these, a method to produce the macromonomer (b1) using a cobalt chain transfer agent is preferred from the viewpoint of being able to efficiently produce the macromonomer (b1).

Examples of the production method of the macromonomer (b1) may include a bulk polymerization method, a solution polymerization method, and an aqueous dispersion polymerization method such as a suspension polymerization method and an emulsion polymerization method. Among these, an aqueous dispersion polymerization method is preferred from the viewpoint of simplification of the recovery process of the macromonomer (b1).

Examples of the solvent (C1) used at the time of obtaining the macromonomer (b1) by a solution polymerization method may include a hydrocarbon such as toluene; an ether such as diethyl ether or tetrahydrofuran; a halogenated hydrocarbon such as dichloromethane or chloroform; a ketone such as acetone; an alcohol such as methanol; a nitrile such as acetonitrile; a vinyl ester such as ethyl acetate; a carbonate such as ethylene carbonate; and supercritical carbon dioxide. These can be used singly or in combination of two or more kinds thereof.

<Other Monomer (b2)>

The other monomer (b2) is one of the raw materials for constituting the polymer (B) contained in the polymer composition and the porous membrane of the invention.

Examples of the other monomer (b2) may include the same monomer as the radically polymerizable monomer to be a raw material for constructing the polymethacrylic acid ester segment in the macromonomer (b1) and methyl acrylate, ethyl acrylate, n-propyl acrylate, isopropyl acrylate, n-butyl acrylate, isobutyl acrylate, t-butyl acrylate, isoamyl acrylate, hexyl acrylate, octyl acrylate, lauryl acrylate, dodecyl acrylate, stearyl acrylate, phenyl acrylate, benzyl acrylate, glycidyl acrylate, 2-ethylhexyl acrylate, 2-hydroxyethyl acrylate, 2-hydroxypropyl acrylate, 2-hydroxybutyl acrylate, 3-hydroxybutyl acrylate, 4-hydroxybutyl acrylate, polyethylene glycol acrylate, polypropylene glycol acrylate, PLACCEL FA (Daicel Corporation, caprolactone-added monomer), methoxyethyl acrylate, ethoxyethyl acrylate, n-butoxyethyl acrylate, iso-butoxyethyl acrylate, t-butoxyethyl acrylate, phenoxyethyl acrylate, nonylphenoxyethyl acrylate, 3-methoxybutyl acrylate, BLEMMER AME-100 and 200 (NOF CORPORATION), BLEMMER 50AOEP-800B (NOF CORPORATION), acrylic acid, methacrylic acid, fumaric acid, maleic anhydride, itaconic acid, itaconic anhydride, bicyclo[2.2.1]-5-heptene-2,3-dicarboxylic anhydride, N-phenylmaleimide, N-cyclohexyl maleimide, N-t-butyl-maleimide, vinyl caprate, vinyl laurate, vinyl stearate, vinyl trifluoroacetate, butadiene, isoprene, 4-methyl-1,3-pentadiene, 1,3-pentadienestyrene, o-methylstyrene, m-methylstyrene, p-methylstyrene, o,p-dimethylstyrene, N-methylol methacrylamide, butoxy methacrylamide, acrylamide, N-methylolacrylamide, butoxy acrylamide, dimethylaminoethyl (meth)acrylate, dimethylaminoethyl (meth)acrylate methyl chloride salt, dimethylaminoethyl (meth)acrylate benzyl chloride salt, diethylaminoethyl (meth)acrylate, diethylaminoethyl (meth)acrylate methyl chloride salt, diethylaminoethyl (meth)acrylate benzyl chloride salt, 3-methacryl oxypropyltrimethoxysilane, 3-methacryloxypropyltriethoxysilane, and vinyltrimethoxysilane. Among these, (meth)acrylic acid or a (meth)acrylate is preferred from the viewpoint of being highly copolymerizable with the macromonomer (b1). Among them, methyl methacrylate, methoxy-diethylene glycol methacrylate, methoxy-nonaethylene glycol methacrylate, 2-hydroxyethyl methacrylate, 2-hydroxyethyl acrylate, and methacrylic acid are preferred.

Here, the term "(meth)acrylic acid" means one or both of acrylic acid having a hydrogen atom bonded to the position of a and methacrylic acid having a methyl group bonded to the position of α. The term "(meth)acrylate" means one or both of an acrylate having a hydrogen atom bonded to the position of a and a methacrylate having a methyl group bonded to the position of a.

<Monomer Composition>

In the invention, the monomer composition contains the macromonomer (b1) and the other monomer (b2).

The content of the macromonomer (b1) with respect to 100 parts by mass of the total amount of the macromonomer (b1) and the other monomer (b2) in the monomer composition is preferably from 5 to 99 parts by mass. The uniformity of the membrane forming solution at the time of preparing the membrane forming solution for obtaining the porous membrane of the invention by adding the polymer (13) to a solution prepared by dissolving the membrane forming polymer (A) in the solvent (C2) tends to be improved in a case in which the content of the macromonomer (b1) is 5 parts by mass or more, and the contact angle of pure water on the porous membrane of the invention is 75° or less in a case in which the content of the macromonomer (b1) is 99 parts by mass or less. The content of the macromonomer (b1) is more preferably 20 parts by mass or more, even more preferably 40 parts by mass or more, and particularly preferably 50 parts by mass or more. The content of the macromonomer (b1) is more preferably 98 parts by mass or less and even more preferably 95 parts by mass or less. More specifically, the content of the macromonomer (b1) with respect to 100 parts by mass of the total amount of the macromonomer (b1) and the other monomer (b2) in the monomer composition is preferably from 40 to 98 parts by mass and even more preferably from 50 to 95 parts by mass.

As the combination of the macromonomer (b1) and the other monomer (b2), the combination of polymethyl methacrylate macromonomer as the macromonomer (b1) and (meth)acrylic acid or a (meth)acrylate as the other monomer (b2) is preferred, the combination of polymethyl methacrylate macromonomer as the macromonomer (b1), and methyl methacrylate, methoxy-diethylene glycol methacrylate, methoxy-nonaethylene glycol methacrylate, 2-hydroxyethyl methacrylate, 2-hydroxyethyl acrylate and methacrylic acid as the other monomer (b2) is more preferred.

<Polymer (B)>

The polymer (B) is one of the constituents of the polymer composition and the porous membrane of the invention.

The polymer (B) is one obtained by polymerizing the monomer composition containing the macromonomer (b1) and the other monomer (b2) and is constituted by at least one kind selected from a block copolymer of the macromonomer (b1) and the other monomer (b2) or a graft copolymer of the other monomer (b2) having the macromonomer (b1) unit at the side chain.

In the invention, the polymer (B) can contain at least one kind selected from a polymer having only the macromonomer (b1) unit, a polymer having only the other monomer (b2) unit, the unreacted macromonomer (b1), or the unreacted other monomer (b2) in addition to those described above.

The "monomer unit" means the monomer unit (monomer unit) constituting the polymer. The "entire monomer units constituting the polymer (B)" means the sum of the number of moles of the "macromonomer (b1) unit" and the number of moles of the "other monomer (b2) unit".

The Mn of the polymer (B) is preferably 1,000 or more and 5,000,000 or less from the viewpoint of the tensile strength, tensile elongation, flexural strength and thermal stability of the polymer (B). The Mn of the polymer (B) is more preferably 2,000 or more and even more preferably 5,000 or more. The Mn of the polymer (B) is more preferably 300,000 or less. More specifically, the Mn of the polymer (B) is more preferably from 2,000 to 300,000 and even more preferably from 5,000 to 200,000.

The polymer (B) can be used singly or in combination of two or more kinds of polymers having different composition ratios, chain distributions or molecular weights.

Examples of the production method of the polymer (B) may include a bulk polymerization method, a solution polymerization method, a suspension polymerization method, and an emulsion polymerization method.

Examples of the solvent (C2) used in the case of producing the polymer (B) by a solution polymerization method may include the same solvent as the solvent (C1) used at the time of obtaining the macromonomer (b1) by a solution polymerization method, and tetrahydrofuran (THF), toluene (TOL), dimethylformamide (DMF), dimethylacetamide (DMAc), dimethyl sulfoxide (DMSO), N-methylpyrrolidone (NMP), hexamethylphosphoric triamide (HMPA), tetramethyl urea (TMU), triethyl phosphate (TEP) and trimethyl phosphate (TMP). Among these, THF, TOL, DMF, DMAc, DMSO and NMP are preferred from the viewpoint of solubility of the membrane forming polymer (A) and the polymer (B) and ease of handling. The solvent (C2) can be used singly or in combination of two or more kinds thereof.

At the time of producing the polymer (B), it is possible to use a chain transfer agent such as mercaptan, hydrogen, a α-methylstyrene dimer, or a terpenoid in order to adjust the molecular weight of the polymer (B).

It is possible to use a radical polymerization initiator at the time of obtaining the polymer (B).

Examples of the radical polymerization initiator may include an organic peroxide and an azo compound.

Specific examples of the organic peroxide may include 2,4-dichlorobenzoyl peroxide, t-butyl peroxypivalate, o-methylbenzoyl peroxide, bis-3,5,5-trimethylhexanoyl peroxide, octanoyl peroxide, t-butyl peroxy-2-ethylhexanoate, cyclohexanone peroxide, benzoyl peroxide, methyl ethyl ketone peroxide, dicumyl peroxide, lauroyl peroxide, diisopropylbenzene hydroperoxide, t-butyl hydroperoxide, and di-t-butyl peroxide.

Specific examples of the azo compound may include 2,2'-azobisisobutyronitrile (AIBN), 2,2'-azobis(2,4-dimethylvaleronitrile), and 2,2'-azobis(2,4-dimethyl-4-methoxyvaleronitrile).

As the radical polymerization initiator, benzoyl peroxide, AIBN, 2,2'-azobis(2,4-dimethylvaleronitrile) and 2,2'-azobis(2,4-dimethyl-4-methoxyvaleronitrile) are preferred from the viewpoint of easy availability and having a half-life temperature suitable for the polymerization condition. These can be used singly or in combination of two or more kinds thereof.

The amount of the radical polymerization initiator added is preferably 0.0001 part by mass or more and 10 parts by mass or less with respect to 100 parts by mass of the other monomer (b2).

The polymerization temperature for obtaining the polymer (B) is preferably from −100 to 250° C., for example, from the viewpoint that the boiling point of the solvent to be used or the use temperature range of the radical polymerization initiator is suitable. The polymerization temperature is more preferably 0° C. or higher and more preferably 200° C. or lower.

The polymer composition according to the first aspect of the invention is preferably a polymer composition containing the polymer (B) obtained by polymerizing a monomer composition containing the methacrylic acid ester macromonomer (b1) that is represented by Formula (1) in which R and $R^1$ to $R''$ are a methyl group and Z is a group derived from a hydrogen atom and a radical polymerization initiator and has a number average molecular weight of from 3,000 to 60,000; and the other monomer (b2) that is at least one kind selected from the group consisting of methyl methacrylate, methoxy-diethylene glycol methacrylate, methoxy-nonaethylene glycol methacrylate, 2-hydroxyethyl methacrylate, 2-hydroxyethyl acrylate, and methacrylic acid.

The polymer composition according to the first aspect of the invention is preferably a polymer composition containing the polymer (B) obtained by polymerizing a monomer composition containing the methacrylic acid ester macromonomer (b1) that is represented by Formula (1) in which R and $R^1$ to $R''$ are a methyl group and Z is a group derived from a hydrogen atom and a radical polymerization initiator and has a number average molecular weight of from 3,000 to 60,000; and the other monomer (b2) that is at least one kind selected from the group consisting of methyl methacrylate, methoxy-diethylene glycol methacrylate, methoxy-nonaethylene glycol methacrylate, 2-hydroxyethyl methacrylate, 2-hydroxyethyl acrylate, and methacrylic acid, and polyvinylidene fluoride having a mass average molecular weight of from 300,000 to 1,500,000 as the membrane forming polymer (A).

<Porous Membrane>

The porous membrane according to the second aspect of the invention is formed from a resin composition containing the membrane forming polymer (A) and the polymer (B).

The resin composition may be one obtained by further adding the membrane forming polymer (A) to the polymer composition according to the first aspect of the invention.

The content of the membrane forming polymer (A) in the porous membrane according to the second aspect of the invention is preferably from 20 to 95 parts by mass with respect to 100 parts by mass of the total amount of the membrane forming polymer (A) and the polymer (B). There is a tendency that a porous membrane can be formed when the content of the membrane forming polymer (A) is 20 parts by mass or more.

In addition, there is a tendency that it is possible to have a contact angle of pure water on the outer surface of the porous membrane of 75° or less when the content of the membrane forming polymer (A) is 95 parts by mass or less.

The content of the membrane forming polymer (A) in the porous membrane is more preferably 25 parts by mass or more, even more preferably 30 parts by mass or more, and particularly preferably 40 parts by mass or more. The content of the membrane forming polymer (A) is more preferably 92 parts by mass or less, more preferably 90 parts by mass or less, and particularly preferably 85 parts by mass or less. More specifically, the content of the membrane forming polymer (A) in the porous membrane is preferably from 25 to 92 parts by mass, more preferably from 30 to 90 parts by mass, and even more preferably from 40 to 85 parts by mass with respect to 100 parts by mass of the total amount of the membrane forming polymer (A) and the polymer (B).

The content of the membrane forming polymer (A) in the resin composition is preferably from 20 to 95 parts by mass with respect to 100 parts by mass of the total amount of the membrane forming polymer (A) and the polymer (B) in the resin composition. There is a tendency that a porous membrane can be formed when the content of the membrane forming polymer (A) is 20 parts by mass or more.

In addition, there is a tendency that it is possible to have a contact angle of pure water on the outer surface of the porous membrane obtained from the resin composition of 75° or less when the content of the membrane forming polymer (A) is 95 parts by mass or less.

The content of the membrane forming polymer (A) in the resin composition is more preferably 25 parts by mass or more, even more preferably 30 parts by mass or more, and particularly preferably 40 parts by mass or more. The content of the membrane forming polymer (A) is more preferably 92 parts by mass or less, more preferably 90 parts by mass or less, and particularly preferably 85 parts by mass or less. More specifically, the content of the membrane forming polymer (A) in the resin composition is preferably from 25 to 92 parts by mass, more preferably from 30 to 90 parts by mass, and even more preferably from 40 to 85 parts by mass with respect to 100 parts by mass of the total amount of the membrane forming polymer (A) and the polymer (B).

The content of the polymer (B) in the porous membrane according to the second aspect of the invention is preferably from 1 to 50 parts by mass with respect to 100 parts by mass of the total amount of the membrane forming polymer (A) and the polymer (B). A porous membrane can be formed when the content of the polymer (B) is 1 part by mass or more.

In addition, it is possible for the porous membrane to exhibit favorable oxidative deterioration resistance and mechanical durability when the content of the polymer (B) is 50 parts by mass or less.

The content of the polymer (B) in the porous membrane is more preferably 2 parts by mass or more, even more preferably 5 parts by mass or more, and particularly preferably 10 parts by mass or more. The content of the polymer (B) is more preferably 45 parts by mass or less, more preferably 43 parts by mass or less, and particularly preferably 40 parts by mass or less. More specifically, the content of the polymer (B) in the porous membrane is preferably from 2 to 45 parts by mass, more preferably from 5 to 43 parts by mass, and even more preferably from 10 to 40 parts by mass with respect to 100 parts by mass of the total amount of the membrane forming polymer (A) and the polymer (B).

The content of the polymer (B) in the resin composition is preferably from 2 to 50 parts by mass with respect to 100 parts by mass of the total amount of the membrane forming polymer (A) and the polymer (B) in the resin composition. A resin composition suitable for obtaining a membrane exhibiting high water permeability can be prepared when the content of the polymer (B) is 2 parts by mass or more.

In addition, a public resin composition to obtain a porous membrane can be prepared when the content of the polymer (B) is 50 parts by mass or less.

The content of the polymer (B) in the resin composition is more preferably 2 parts by mass or more, even more preferably 5 parts by mass or more, and particularly preferably 10 parts by mass or more. The content of the polymer (B) is more preferably 45 parts by mass or less, more preferably 43 parts by mass or less, and particularly preferably 40 parts by mass or less. More specifically, the content of the polymer (B) in the resin composition is preferably from 2 to 45 parts by mass, more preferably from 5 to 43 parts by mass, and even more preferably from 10 to 40 parts by mass with respect to 100 parts by mass of the total amount of the membrane forming polymer (A) and the polymer (B).

The average pore size of the pores in the porous membrane according to the second aspect of the invention is preferably 500 nm or less. It is suitable for obtaining a membrane which is able to remove viruses or suspended solids in service water and exhibits favorable fractionation performance and high water permeability when the average pore size of the pores in the porous membrane of the invention is 500 nm or less.

The average pore size of the pores in the porous membrane is preferably 1 nm or more and 500 nm or less from the viewpoint of availability of using the porous membrane for the removal of viruses, the purification of proteins or enzymes or a service water application. There is a tendency that the removal of viruses or suspended solids in service water is possible when the average pore size of the pores is 500 nm or less, and there is a tendency that a high seepage pressure is not required at the time of treating water when the average pore size is 1 nm or more. The average pore size of the pores is more preferably 300 nm or less, even more preferably 120 nm or less, and particularly preferably 95 nm or less. More specifically, the average pore size of the pores in the porous membrane is more preferably from 3 to 120 nm and more preferably from 5 to 95 nm.

Incidentally, the average pore size of the pores in the porous membrane in the second aspect of the invention refers to the average pore size obtained by actually measuring the greatest diameter of the pores at the outer surface portion of the porous membrane of the invention using a scanning electron microscope (product name: JSM-7400 manufactured by JEOL Ltd.).

Specifically, the average pore size can be determined by a method to obtain an average pore size by selecting five or more arbitrary locations in a range of 500 μm×500 μm for each from the outer surface of the porous membrane, measuring the pore size of 30 pores which are present at the five locations and randomly selected, and determining the average value of the pore sizes measured.

The porous membrane according to the second aspect of the invention can have an outer surface on which the contact angle of pure water is 75° or less. The contact angle on the outer surface of the porous membrane is an index indicating the hydrophilicity of outer surface of the porous membrane. The outer surface of the porous membrane exhibits higher hydrophilicity as the contact angle on the outer surface of the porous membrane of the invention is smaller, and thus higher water permeating performance of the porous membrane can be expected.

It is possible for the porous membrane of the invention to exhibit favorable water permeability as the contact angle of pure water on the outer surface of the porous membrane is decreased to 75° or less.

Examples of the method to decrease the contact angle of pure water on the outer surface of the porous membrane may include a method in which the porous membrane is obtained using a copolymer of the macromonomer (b1), and a monomer having a hydrophilic functional group such as a hydroxyl group or a carboxyl group as the other monomer (b2) as the polymer (B). It is possible to obtain a porous membrane in which a polymer segment having a hydrophilic functional group is efficiently unevenly distributed on the outer surface thereof by obtaining the porous membrane using the above copolymer.

In addition, in a case in which the porous membrane is a flat membrane, it is possible to decrease the contact angle of pure water on the outer surface of the porous membrane by forming a flat membrane by a manufacturing method including a process of coating a polymer composition on a smooth substrate through a discharge port (spinneret) using the polymer composition according to the first aspect of the invention and coagulating it in a coagulating liquid. Furthermore, it is possible to have an average pore size in a preferred range as the above manufacturing method includes a process of preparing an aqueous solution of the solvent (C2) as the coagulating liquid.

In a case in which the porous membrane is a hollow fiber membrane, it is possible to decrease the contact angle of pure water on the outer surface of the porous membrane by forming a hollow fiber membrane by a manufacturing method including a process of coating a polymer composition on a hollow support in the inside of the spinning nozzle or in the vicinity of the discharge port of the spinning nozzle using the polymer composition according to the first aspect of the invention and coagulating it in a coagulating liquid. At this time, it is preferable to provide an air gap region before coagulating the precursor of the porous membrane. The air gap refers to the space between the discharge port and the coagulating liquid surface to be exposed to the precursor and the air (outside air). It is possible to cause the spinodal decomposition of the precursor surface of the porous membrane by the water vapor contained in the air (outside air) as an air gap is provided, and thus more precise configuration control is possible.

Furthermore, it is possible to have an average pore size in a preferred range as the above manufacturing method includes a process of preparing an aqueous solution of the solvent (C2) as the coagulating liquid.

The contact angle of pure water on the outer surface of the porous membrane is more preferably 73° or less. In addition, it is more preferable as the lower limit value of the contact angle of pure water on the outer surface of the porous membrane is lower, and the lower limit value is generally 1° or more. The lower limit value of the contact angle of pure water on the outer surface of the porous membrane varies depending on the kind of the polymer (A) used, and the lower limit value is generally 20° or more in the case of using PVDF as the polymer (A). More specifically, the contact angle of pure water on the outer surface of the porous membrane is preferably from 1 to 73°, more preferably from 20 to 73°, and even more preferably from 40 to 65°.

In the porous membrane according to the second aspect of the invention, the flux of pure water is preferably $1.0 \times 10^{-10}$ (m$^3$/m$^2$/s/Pa) or more. In a case in which the flux is less than $1.0 \times 10^{-10}$ (m$^3$/m$^2$/s/Pa), it is required to operate at a higher pressure to obtain a high permeable water volume and thus it is not cost-effective. Here, the flux is a numerical value that can be determined by inserting the porous membrane into a stainless holder with tank (KST-47 (trade name) manufactured by ADVANTEC Co. Ltd.), filling deionized water in the tank, and calculating using the following Equation.

$$\text{Flux} = L/(S \times t \times P)$$

Flux: flux of pure water (m³/m²/s/Pa)
L: permeable volume of pure water (m³)
S: effective membrane area (m²)
t: permeation time (s)
P: measuring pressure (Pa)

It is preferable that the rejecting rate of the porous membrane of the invention with respect to the fine particles of 0.130 μm or less be 90% or more.

There is a tendency that clogging in the removal of viruses, the purification of proteins or enzymes, or the service water application or an increase in differential pressure in filtration occurs and the lifespan is shortened when the rejecting rate is less than 90%.

Here, the fine particle rejecting rate is a numerical value that can be determined by filling an evaluation stock solution prepared by dispersing polystyrene latex particles having an average particle size of 0.132 μm (manufactured by MAX FAIR, nominal particle size of 0.132 μm) in deionized water so as to have a concentration of 25 ppm in the tank of a stainless holder with tank (KST-47 (trade name) manufactured by ADVANTEC Co. Ltd.), filtering the evaluation stock solution through the porous membrane inserted into the stainless holder with tank, and calculating from the absorbance of the evaluation stock solution and the filtrate measured at a wavelength of 320 nm using the following Equation.

$$Rjc=[(A1-A2)/A1] \times 100$$

Rjc: fine particle rejecting rate (%)
A1: absorbance of evaluation stock solution (abs)
A2: absorbance of filtrate (abs)

The absorbance can be measured using a spectrophotometer (LAMBDA850 manufactured by PerkinElmer Co., Ltd.).

Examples of the form of the porous membrane according to the second aspect of the invention may include a flat membrane and a hollow fiber membrane.

The thickness is preferably from 10 to 1,000 μm in a case in which the porous membrane is a flat membrane. There is a tendency that the membrane exhibits high stretchability and satisfactory durability when the thickness is 10 μm or more, and there is a tendency that the membrane can be produced at low cost when the thickness is 1,000 μm less. The thickness is more preferably 20 μm or more and even more preferably 30 μm or more in a case in which the porous membrane is a flat membrane. The thickness is more preferably 900 μm or less and even more preferably 800 μm or less. More specifically, the thickness is more preferably from 20 to 900 μm and even more preferably from 30 to 800 μm in a case in which the porous membrane is a flat membrane.

In a case in which the porous membrane according to the second aspect of the invention is a flat membrane, examples of the internal structure of the membrane may include a dipping structure in which the size of the pores in the membrane cross section (namely, cross section in the case of cutting the membrane in the thickness direction) decreases in a particular direction or a structure having homogeneous pores.

In a case in which the porous membrane according to the second aspect of the invention is a flat membrane, it is possible to have a macrovoid or a spherulitic structure in the membrane.

The macrovoid refers to a structure having an average pore size of the porous membrane of approximately 10 μm or more.

In a case in which the shape of the porous membrane according to the second aspect of the invention is a hollow fiber membrane, the outer diameter of the hollow fiber membrane is preferably from 20 to 2,000 μm. There is a tendency that the thread breakage hardly occurs at the time of forming the membrane when the outer diameter of the porous membrane is 20 μm or more. In addition, there is a tendency that the hollow shape is easily maintained and the membrane is hardly flattened particularly even though an external pressure is applied when the outer diameter of the hollow fiber membrane is 2,000 μm or less. The outer diameter of the hollow fiber membrane is more preferably 30 μm or more and even more preferably 40 μm or more. In addition, the outer diameter of the hollow fiber membrane is more preferably 1,800 μm or less and even preferably 1,500 μM or less. More specifically, the outside diameter of the hollow fiber membrane is more preferably from 30 to 1,800 μm and even more preferably from 40 to 1,500 μm in a case in which the shape of the porous membrane is a hollow fiber membrane.

In a case in which the shape of the porous membrane according to the second aspect of the invention is a hollow fiber membrane, the wall thickness of the hollow fiber membrane is preferably from 5 to 500 μm. There is a tendency that the thread breakage hardly occurs at the time of forming the membrane when the wall thickness of the hollow fiber membrane is 5 μm or more. In addition, the hollow shape tends to be easily maintained when the wall thickness of the hollow fiber membrane is 500 μm or less. The wall thickness of the hollow fiber membrane is preferably 10 μm or more and even more preferably 15 μm or more. The wall thickness of the hollow fiber membrane is more preferably 480 μm or less and even more preferably 450 μm or less. More specifically, the wall thickness of the hollow fiber membrane is more preferably from 10 to 480 μm and even more preferably from 15 to 450 μm in a case in which the shape of the porous membrane is a hollow fiber membrane.

Here, the "wall thickness of the hollow fiber membrane" means the length from the outer surface to the inner surface of the cross section in the case of cutting the membrane in the thickness direction.

The porous membrane according to the second aspect of the invention is preferably a porous membrane formed from a resin composition containing the polymer (B) obtained by polymerizing a monomer composition containing the methacrylic acid ester macromonomer (b1) that is represented by Formula (1) in which R and $R^1$ to R'' are a methyl group and Z is a group derived from a hydrogen atom and a radical polymerization initiator and has a number average molecular weight of from 3,000 to 60,000; and the other monomer (b2) that is at least one kind selected from the group consisting of methyl methacrylate, methoxy-diethylene glycol methacrylate, methoxy-nonaethylene glycol methacrylate, 2-hydroxyethyl methacrylate, 2-hydroxyethyl acrylate, and methacrylic acid, and polyvinylidene fluoride having a mass average molecular weight of from 300,000 to 1,500,000 as the membrane forming polymer (A).

The porous membrane according to the second aspect of the invention is preferably a porous membrane formed from a resin composition containing the polymer (B) obtained by polymerizing a monomer composition containing the methacrylic acid ester macromonomer (b1) that is represented by Formula (1) in which R and $R^1$ to R'' are a methyl group and Z is a group derived from a hydrogen atom and a radical polymerization initiator and has a number average molecular weight of from 3,000 to 60,000; and the other monomer (b2) that is at least one kind selected from the group consisting of methyl methacrylate, methoxy-diethylene glycol methacrylate, methoxy-nonaethylene glycol methacrylate, 2-hydroxyethyl methacrylate, 2-hydroxyethyl acrylate, and methacrylic acid, and polyvinylidene fluoride having a mass average molecular weight of from 300,000 to 1,500,000 as the membrane forming polymer (A).

The porous membrane according to the second aspect of the invention is a porous membrane formed from a resin composition containing the polymer (B) obtained by polymerizing a monomer composition containing the methacrylic acid ester macromonomer (hi) that is represented by Formula (1) in which R and $R^1$ to $R''$ are a methyl group and Z is a group derived from a hydrogen atom and a radical polymerization initiator and has a number average molecular weight of from 3,000 to 60,000; and the other monomer (b2) that is at least one kind selected from the group consisting of methyl methacrylate, methoxy-diethylene glycol methacrylate, methoxy-nonaethylene glycol methacrylate, 2-hydroxyethyl methacrylate, 2-hydroxyethyl acrylate, and methacrylic acid, and polyvinylidene fluoride having a mass average molecular weight of from 300,000 to 1,500,000 as the membrane forming polymer (A), and the porous membrane is preferably a porous membrane in which the contact angle of pure water on the outer surface thereof is from 20 to 73°.

Examples of the method for producing the porous membrane according to the second aspect of the invention may include the following methods.

First, a membrane forming solution is obtained by dissolving the membrane forming polymer (A) and the polymer (B) in a solvent (C3) to be described later. Subsequently, a porous membrane precursor is obtained by coagulating the membrane forming solution thus obtained in a coagulating liquid. Thereafter, the solvent (C3) remaining in the porous membrane precursor is removed by washing, and the porous membrane precursor after washing is dried, whereby the porous membrane of the second aspect of the invention is obtained.

In the above method, the mixing ratio of the membrane forming polymer (A), the polymer (B), and the solvent (C3) is not particularly limited as long as the membrane forming solution is uniform.

In other words, the membrane forming solution is one which contains the resin composition and the solvent (C3).

Examples of the method of preparing the membrane forming solution may include a method in which the membrane forming polymer (A) and the polymer (B) are mixed at once and dissolved in the solvent (C3) and a method in which the membrane forming polymer (A) and the polymer (B) are dissolved in the solvent (C3) while being added little by little.

Incidentally, at the time of obtaining the membrane forming solution, it is possible to dissolve the membrane forming polymer (A) and the polymer (B) while heating the solvent (C3) as long as the temperature is equal to or lower than the boiling point of the solvent (C3). In addition, it is possible to cool the membrane forming solution if necessary.

Examples of the solvent (C3) may include those which are the same as the solvent (C2). Among these, DMF, DMAc, DMSO and NMP are preferred from the viewpoint of the solubility of the membrane forming polymer (A) and the polymer (B) and ease of handling. The solvent (C3) can be used singly or in combination of two or more kinds thereof.

The content of the membrane forming polymer (A) in the membrane forming solution is preferably from 0.1 to 40% by mass and more preferably from 5 to 30% by mass with respect to the total mass of the membrane forming solution. In addition, the content of the polymer (B) in the membrane forming solution is preferably from 0.1 to 30% by mass and more preferably 1 to 15% by mass with respect to the total mass of the membrane forming solution. In addition, the content of the solvent (C3) in the membrane forming solution is preferably from 50 to 99.8% by mass and more preferably from 65 to 94% by mass with respect to the total mass of the membrane forming solution. There is a tendency that highly uniform membrane forming solution can be prepared as the contents of the membrane forming polymer (A), the polymer (B), and the solvent (C3) in the membrane forming solution are set to be in the above ranges. The phase separation or the like is less likely to occur with the passage of time and the time-dependent change is also small in the case of a highly uniform membrane forming solution. Incidentally, the membrane forming solution may be in a state in which a part of the membrane forming polymer (A) or the polymer (B) is dispersed as long as the membrane forming solution is uniform and able to maintain the uniformity even though a part of the membrane forming polymer (A) or the polymer (B) is not dissolved but dispersed.

In a case in which the porous membrane is a flat membrane, the membrane forming solution is coated on a substrate to obtain a coating film layered body and the coating film layered body thus obtained is coagulated by being immersed in a coagulating liquid, whereby the porous membrane precursor can be obtained.

The material of the substrate is not particularly limited, but a glass substrate is preferred.

The method to coat the membrane forming solution on a substrate is not particularly limited, but it is preferable to use a bar coater.

The thickness of the coating film layered body can be appropriately changed according to the desired thickness of the porous membrane.

In a case in which the porous membrane is a hollow fiber membrane, the membrane forming solution of the polymer composition is coated on a hollow support and is coagulated by being immersed in a coagulating liquid, whereby the porous membrane precursor can be obtained.

As the coagulating liquid used at the time of obtaining the porous membrane precursor, an aqueous solution of the solvent (C3) used in the membrane forming solution having a concentration of from 0 to 50% by mass is preferred from the viewpoint of pore size control of the membrane. The amount of the coagulating liquid used is preferably from 500 to 100,000,000 parts by mass and more preferably from 2,000 to 50,000,000 parts by mass with respect to 100 parts by mass of the membrane forming solution.

Examples of the method to control the pore size of the porous membrane may include a method to use an aqueous solution of the solvent (C2) as the coagulating liquid.

The temperature of the coagulation liquid is preferably 10° C. or higher and 90° C. or lower. There is a tendency that the water permeating performance of the porous membrane of the invention can be improved when the temperature of the coagulating liquid is 10° C. or higher, and there is a tendency that the mechanical strength of the porous membrane of the invention is not impaired when the temperature is 90° C. or lower. The time to immerse the support coated with the membrane forming solution in the coagulation liquid is preferably from 0.001 to 60 minutes.

It is preferable to remove the solvent (C3) by immersing and washing the porous membrane precursor obtained in hot water at from 60 to 100° C. for from 0.001 to 60 minutes. A high washing effect for the porous membrane precursor tends to be obtained when the temperature of the hot water is 60° C. or higher, and the porous membrane precursor tends to be hardly fused when the temperature of the hot water is 100° C. or lower.

It is preferable to dry the porous membrane precursor after washing at 60° C. or higher and 120° C. or lower for 1 minute or longer and 24 hours or shorter. It is preferable for industrial production since the time for drying treatment is short and the production cost is also cut down when the drying temperature of the porous membrane precursor after washing is 60° C. or higher. In addition, it is preferable that the drying temperature of the porous membrane precursor after washing be 120° C. or lower since there is a tendency that porous membrane precursor is not too shrunk during the drying process and also fine cracks are not generated on the outer surface of the membrane.

EXAMPLES

Hereinafter, the invention will be described in detail with reference to Examples. Incidentally, in the following, the composition and structure of the macromonomer (b1) and the polymer, the Mw of the polymer, the Mn and Mw/Mn of the macromonomer (b1) and the polymer were evaluated by the following methods.

In addition, in the following, the "parts" and the "%" indicate the "parts by mass" and the "% by mass", respectively.

(1) Composition and structure of macromonomer (b1) and polymer

The composition and structure of the macromonomer (b1) and the polymer were analyzed by $^1$H-NMR (product name: JNM-EX270 manufactured by JEOL Ltd.).

(2) Mw of membrane forming polymer (A)

The Mw of the membrane forming polymer (A) was determined using a GPC ("HLC-8020" (trade name) manufactured by TOSOH CORPORATION) under the following conditions.

Column: TSK GUARD COLUMN α (7.8 mm×40 mm) and three TSK-GEL α-M (7.8×300 mm) are connected in series Eluent: DMF 20 mM LiBr solution
Measuring temperature: 40° C.
Flow rate: 0.1 mL/minute Incidentally, the Mw was determined using a calibration curve created using the polystyrene standards manufactured by TOSOH CORPORATION (nine kinds of Mp (peak top molecular weight) of 76,969,900, 2,110,000, 1,260,000, 775,000, 355,000, 186,000, 19,500, 1,050 and the styrene monomer (M=104) manufactured by NS styrene Monomer Co., Ltd.).

(3) Mn and Mw/Mn of macromonomer (b1), controlled polymerization polymer (b'1) and polymer (13)

The Mn and Mw/Mn of the macromonomer (b1) and the controlled polymerization polymer (b'1) were determined using a GPC ("HLC-8220" (trade name) manufactured by TOSOH CORPORATION) under the following conditions.

Column: TSK GUARD COLUMN SUPER HZ-L (4.6×35 mm) and two TSK-GEL SUPER HZM-N (6.0×150 mm) are connected in series Eluent: chloroform, DMF, or THF
Measuring temperature: 40° C.
Flow rate: 0.6 mL/minute Incidentally, the Mw and Mn were determined using a calibration curve created using polymethyl methacrylate manufactured by Polymer Laboratories Ltd. (four kinds of Mp (peak top molecular weight) of 141,500, 55,600, 10,290 and 1,590).

(4) Contact Angle

The contact angle of pure water on the porous membrane was measured by the following method.

The test piece of porous membrane was placed on a sample table of a contact angle measuring device (product name: DSA-10 manufactured by Kruss GmbH). Subsequently, the state of the water droplet in 3 seconds after a drop (10 μl) of pure water (for LC/MS manufactured by Wako Pure Chemical Industries, Ltd.) was dropped on the outer surface of the sample for the contact angle measurement was photographed using a CCD camera attached to the device. The contact angle of the water droplet of the photograph thus obtained was determined by an automatic measurement using the image processing program incorporated in the contact angle measuring device.

(5) The Average Pore Size

Five or more arbitrary locations in a range of 500 μm×500 μm were selected from the outer surface of the porous membrane, the pore size of 30 pores which were present at the five locations and randomly selected was measured, and the average value of the pore sizes measured was adopted as the average pore size.

(6) Measurement of Flux

The test piece of porous membrane was cut into a circle having a diameter of 4.2 cm and impregnated with ethanol by being immersed in ethanol (manufactured by Wako Pure Chemical Industries, Ltd., special grade reagent) for 20 minutes. Subsequently, the test piece of porous membrane impregnated with ethanol was immersed in deionized water for two hours or longer and inserted into a stainless holder with tank (KST-47 (trade name) manufactured by ADVANTEC Co. Ltd., effective membrane area of 12.5 cm$^2$). The inside of the stainless holder with tank was filled with about 150 ml of deionized water, the top cap was then sealed with a clamp so that there is no leakage by pressure, and the flux was calculated from the permeable water volume per unit time measured using the air at a measuring pressure of 0.1 MPa using the following Equation. A greater flux value indicates higher water permeating performance.

$$Flux = L/(S \times t \times P)$$

Flux: flux of pure water (m$^3$/m$^2$/s/Pa)
L: permeable volume of pure water (m$^3$)
S: effective membrane area (m$^2$)
t: permeation time (s)
P: measuring pressure (Pa)

(7) Fine Particle Rejecting Rate

The porous membrane used in the flux measurement was inserted into a stainless holder with tank (KST-47 (trade name) manufactured by ADVANTEC Co. Ltd.), an evaluation stock solution prepared by dispersing polystyrene latex particles having an average particle size of 0.132 μm manufactured by MAGS FAIR, nominal particle size of 0.132 μm) in deionized water so as to have a concentration of 25 ppm was filled in the tank, the evaluation stock solution was filtered through the porous membrane inserted at a measuring pressure of 0.1 MPa, and the fine particle rejecting rate was calculated from the absorbance of the evaluation stock solution and the filtrate measured at a wavelength of 320 nm using the following Equation:

$$Rjc = [(A1-A2)/A1] \times 100$$

Rjc: fine particle rejecting rate (%)
A1: absorbance of evaluation stock solution (abs)
A2: absorbance of filtrate (abs).

For the absorbance measurement, a spectrophotometer (LAMBDA850 manufactured by PerkinElmer Co., Ltd.) was used.

(Synthesis Example 1) Synthesis of Cobalt Chain Transfer Agent CoBF-1

Into a reactor equipped with a stirrer, 1.00 g of cobalt(II) acetate tetrahydrate (manufactured by Wako Pure Chemical Industries, Ltd., Wako special grade), 1.93 g of diphenyl glyoxime (manufactured by Tokyo Chemical Industry Co., Ltd., EP grade), and 80 ml of diethyl ether (manufactured by KANTO KAGAKU, special grade) that was deoxygenated by nitrogen bubbling in advance were introduced under a nitrogen atmosphere and stirred for 30 minutes at room temperature. Subsequently, 10 ml of boron trifluoride diethyl ether complex (manufactured by Tokyo Chemical Industry Co., Ltd., EP grade) was added thereto, and the mixture was further stirred for 6 hours. The mixture was filtered, and the solid was washed with diethyl ether (manufactured by KANTO KAGAKU, special grade) and vacuum dried for 15 hours, thereby obtaining 2.12 g of the cobalt chain transfer agent CoBF-1 of a red-brown solid.

(Synthesis Example 2) Synthesis of Dispersant 1

Into a reactor equipped with a stirrer, a cooling tube, and a thermometer, 61.6 parts of 17% aqueous solution of potassium hydroxide, 19.1 parts of methyl methacrylate (trade name: ACRYESTER M manufactured by Mitsubishi Rayon Co., Ltd.), and 19.3 parts of deionized water were introduced. Subsequently, the liquid in the reactor was stirred at room temperature, the exothermic peak thereof was confirmed, and then the liquid was further stirred for 4 hours. Thereafter, the reaction mixture in the reactor was cooled to room temperature, thereby obtaining an aqueous solution of potassium methacrylate.

Subsequently, 900 parts of deionized water, 70 parts of a 42% aqueous solution of sodium 2-sulfoethyl methacrylate (trade name: ACRYESTER SEM-Na manufactured by Mitsubishi Rayon Co., Ltd.), 16 parts of the above aqueous solution of potassium methacrylate, and 7 parts of methyl methacrylate (trade name: ACRYESTER M manufactured by Mitsubishi Rayon Co., Ltd.) were introduced into a polymerization apparatus equipped with a stirrer, a cooling tube, and a thermometer and stirred, the temperature thereof was raised to 50° C. while purging the inside of the polymerization apparatus with nitrogen. Thereto, 0.053 part of 2,2'-azobis(2-methyl propionamidine) dihydrochloride (trade name: V-50 manufactured by Wako Pure Chemical Industries, Ltd.) was added as the polymerization initiator and the temperature thereof was further raised to 60° C. After the polymerization initiator was introduced, 1.4 parts of methyl methacrylate (trade name: ACRYESTER M manufactured by Mitsubishi Rayon Co., Ltd.) was added thereto every 15 minutes five times in total in a divided manner. Thereafter, the liquid in the polymerization apparatus was held for six hours at 60° C. while stirring, then cooled to room temperature, thereby obtaining the dispersant 1 that was a clear aqueous solution and contained the solid matter at 8%.

(Synthesis Example 3) Synthesis of Macromonomer (b1-1)

Into a flask with a cooling tube, 100 parts of methyl methacrylate (trade name: ACRYESTER M manufactured by Mitsubishi Rayon Co., Ltd.), 150 parts of deionized water, 1.39 parts of sodium sulfate, 1.53 parts of the dispersant 1, and 0.00075 part of CoBF-1 were introduced. The CoBF-1 was dissolved in a state in which the liquid in the flask was warmed to 70°, and the inside of the flask was purged with nitrogen by nitrogen bubbling. Subsequently, 1 part by mass of AIBN was added thereto, and the mixture was held for 6 hours in a state in which the internal temperature was maintained at 70° C., thereby completing the polymerization. Thereafter, the polymerization reaction mixture was cooled to room temperature and further filtered to recover the polymer. The polymer thus obtained was washed with water and vacuum dried for the night at 50° C., thereby obtaining the macromonomer (b1-1). The Mn of the macromonomer (b1-1) was 11,000, the Mw/Mn was 2.0, and the average degree of polymerization was (110). The introduction rate of the terminal double bond into the macromonomer (b1-1) was almost 100%. In the case of the macromonomer (b1-1), R in Formula (1) above was a methyl group.

(Synthesis Example 4) Synthesis of Controlled Polymerization Polymer (b'1-1)

In to a flask with a cooling tube, 100 parts of MMA, 0.221 part of 2-cyano-2-propyl benzothionate (manufactured by Sigma-Aldrich Co., LLC., purity of 97%>HPLC), and 100 parts of toluene (manufactured by Wako Pure Chemical Industries, Ltd., special grade reagent) as the solvent (C1) were introduced, the inside of the flask was purged with nitrogen by nitrogen bubbling. Subsequently, 0.1 part of AIBN (manufactured by Wako Pure Chemical Co., Wako special grade) was added thereto as the radical polymerization initiator in a state in which the liquid in the flask was heated and the internal temperature was maintained at 70° C., and the mixture was then held for four hours, the temperature thereof was subsequently raised to 80° C., and the mixture was held for 30 minutes, thereby completing the polymerization. Thereafter, the polymerization reaction mixture was cooled to room temperature and reprecipitated with a great amount of methanol (manufactured by Wako Pure Chemical Industries, Ltd., special grade reagent). The polymer precipitated by the reprecipitation was recovered and vacuum dried for the night under the conditions of 50° C. and 50 mmHg (6.67 kPa), thereby obtaining the controlled polymerization polymer (b'1-1). The Mn of the controlled polymerization polymer (b'1-1) was 11,000, and the Mw/Mn was 1.1.

(Synthesis Example 5) Synthesis of Polymer (B-1)

Into a flask with a cooling tube, a monomer composition containing 50 parts of the macromonomer (b1-1), 50 parts of PME-400 (trade name: BLEMMER PME-400 manufactured by NOF CORPORATION) as the other monomer (b2), and 150 parts of toluene (manufactured by Wako Pure Chemical Industries, Ltd., special grade reagent) as the solvent (C2) was introduced, and the inside of the flask was purged with nitrogen by nitrogen bubbling. Subsequently, 0.1 part of AIBN (manufactured by Wako Pure Chemical Industries, Ltd., Wako special grade) as the radical polymerization initiator was added to the monomer composition in a state in which the monomer composition was warmed and the internal temperature thereof was maintained at 70° C., and the mixture was held for 4 hours, the temperature thereof was subsequently raised to 80° C., and the mixture was held for 30 minutes, thereby completing the polymerization.

Thereafter, the polymerization reaction mixture was cooled to room temperature and reprecipitated with a great amount of hexane (manufactured by Wako Pure Chemical Co., special grade reagent). The polymer precipitated by the reprecipitation was recovered and vacuum dried for the night under the conditions of 50° C. and 50 mmHg (6.67 kPa), thereby obtaining the polymer (B-1).

The yield of the polymer (B-1) thus obtained was about 100%. For the GPC measurement, chloroform was used as the eluent. The Mn of the polymer (B-1) was 14,000, and the Mw/Mn was 2.1. The content of the macromonomer (b1-1) unit in the polymer (B-1) determined by $^1$H-NMR was 50%. The evaluation results are presented in Table 1.

TABLE 1

| | | | Synthesis Example 5 | Synthesis Example 6 | Synthesis Example 7 | Synthesis Example 8 | Synthesis Example 9 | Synthesis Example 10 |
|---|---|---|---|---|---|---|---|---|
| | Polymer (B) or polymer (B') | | B-1 | B-2 | B-3 | B-4 | B-5 | B-6 |
| Monomer composition (parts) | Macromonomer (b1-1) | | 50 | 70 | 70 | 70 | 70 | 70 |
| | Controlled polymerization polymer (b'1-1) | | — | — | — | — | — | — |
| | Another monomer (b-2) | MMA | — | — | — | — | — | — |
| | | PME-100 | — | — | 30 | — | — | — |
| | | PME-400 | 50 | 30 | — | — | — | — |
| | | HEMA | — | — | — | 30 | — | — |
| | | HEA | — | — | — | — | — | 30 |
| | | MAA | — | — | — | — | 30 | — |
| | Solvent (C2) | TOL | 150 | 150 | 150 | — | — | — |
| | | DMF | — | — | — | 150 | 150 | — |
| | | DMAc | — | — | — | — | — | 150 |
| Evaluation results | Composition of polymer (B) or polymer (B') | Macromonomer (b1-1) unit | 50 | 69 | 70 | 71 | 67 | 75 |
| | | Controlled polymerization polymer (b'1-1) unit | — | — | — | — | — | — |
| | | Another monomer (b-2) unit MMA | — | — | — | — | — | — |
| | | PME-100 | 50 | 31 | 30 | — | — | — |
| | | PME-400 | — | — | — | — | — | — |
| | | HEMA | — | — | — | 29 | — | — |
| | | HEA | — | — | — | — | — | 25 |
| | | MAA | — | — | — | — | 33 | — |
| | Molecular weight and molecular weight distribution | Mn | 14,000 | 12,000 | 9,000 | 10,000 | 11,000 | 19,000 |
| | | Mw/Mn | 2.1 | 2.5 | 2.5 | 2.3 | 2.4 | 1.9 |

| | | | Synthesis Example 11 | Synthesis Example 12 | Synthesis Example 13 | Synthesis Example 14 | Synthesis Example 15 |
|---|---|---|---|---|---|---|---|
| | Polymer (B) or polymer (B') | | B-7 | B-8 | B'-1 | B'-2 | B'-3 |
| Monomer composition (parts) | Macromonomer (b1-1) | | 50 | 40 | — | — | — |
| | Controlled polymerization polymer (b'1-1) | | — | — | — | — | 50 |
| | Another monomer (b-2) | MMA | 20 | 30 | 50 | 70 | — |
| | | PME-100 | — | — | — | — | — |
| | | PME-400 | — | — | 50 | 30 | — |
| | | HEMA | — | — | — | — | — |
| | | HEA | 30 | 30 | — | — | 50 |
| | | MAA | — | — | — | — | — |
| | Solvent (C2) | TOL | — | — | 150 | 150 | 150 |
| | | DMF | — | — | — | — | — |
| | | DMAc | 150 | 150 | — | — | — |
| Evaluation results | Composition of polymer (B) or polymer (B') | Macromonomer (b1-1) unit | 75 | 76 | — | — | — |
| | | Controlled polymerization polymer (b'1-1) unit | — | — | — | — | 77 |
| | | Another monomer (b-2) unit MMA | | | 50 | 70 | — |
| | | PME-100 | — | — | — | — | — |
| | | PME-400 | | | 50 | 30 | — |
| | | HEMA | — | — | — | — | — |
| | | HEA | 25 | 24 | — | — | 23 |
| | | MAA | — | — | — | — | — |
| | Molecular weight and molecular weight distribution | Mn | 21,000 | 28,000 | 70,000 | 50,000 | 18,500 |
| | | Mw/Mn | 1.9 | 1.9 | 1.4 | 1.3 | 1.3 |

The abbreviations in Table 1 indicate the following compounds, respectively. MMA: methyl methacrylate (trade name: ACRYESTER M manufactured by Mitsubishi Rayon Co., Ltd.)
PME-100: (BLEMMER PME-100 (trade name) manufactured by NOF CORPORATION)
PME-400: (BLEMMER PME-400 (trade name) manufactured by NOF CORPORATION)
HEMA: 2-hydroxyethyl methacrylate (ACRYESTER HOMA manufactured by Mitsubishi Rayon Co., Ltd.)
HEA: 2-hydroxyethyl acrylate (manufactured by Wako Pure Chemical Industries, Ltd., Wako first grade)
MAA: methacrylic acid (trade name: methacrylic acid manufactured by Mitsubishi Rayon Co., Ltd.)
TOL: toluene (manufactured by Wako Pure Chemical Industries, Ltd., special grade reagent)
THF: tetrahydrofuran (manufactured by Wako Pure Chemical Industries, Ltd., special grade reagent)
DMF: N,N-dimethylformamide (manufactured by Wako Pure Chemical Industries, Ltd., special grade reagent)
DMAc: N,N-dimethylacetamide (manufactured by Wako Pure Chemical Industries, Ltd., Wako first grade)

(Synthesis Examples 6, 7, 13 and 14) Synthesis of Polymers (B-2), (B-3), (B'-1), and (B'-2)

The polymers (B-2), (B-3), (B'-1), and (B'-2) were obtained in the same manner as Synthesis Example 5 except that the monomer compositions having the compositions presented in Table 1 were used. The yield of the polymers (13-2), (B-3), (B'-1), and (B'-2) thus obtained was almost 100%. For the GPC measurement, chloroform was used as the eluent. The evaluation results of the polymers (13-2), (13-3), (13'-1), and (B'-2) are presented in Table 1.

(Synthesis Example 8) Synthesis of Polymer (B-4)

The polymer (B-4) was obtained in the same manner as Synthesis Example 5 except that the monomer composition having the composition presented in Table 1 and the solvent (C2) were used and deionized water was used instead of hexane for reprecipitation of the polymer. The yield of the polymer (B-4) thus obtained was almost 100%. For the GPC measurement, DMF was used as the eluent. The evaluation results of the polymer (B-4) are presented in Table 1.

(Synthesis Example 9) Synthesis of Polymer (B-5)

The polymer (B-5) was obtained in the same manner as Synthesis Example 7 except that the monomer composition having the composition presented in Table 1 was used. The yield of the polymer (B-5) thus obtained was almost 100%. For the GPC measurement, chloroform was used as the eluent. The evaluation results of the polymer (13-5) are presented in Table 1.

(Synthesis Examples 10, 11, and 12) Synthesis of Polymers (B-6), (B-7), and (B-8)

The polymers (B-6), (B-7), and (B-8) were obtained in the same manner as Synthesis Example 5 except that the monomer compositions having the compositions presented in Table 1 and the solvent (C2) were used and deionized water was used instead of hexane for reprecipitation of the polymers. The yield of the polymers (B-6), (B-7), and (B-8) thus obtained was almost 100%. For the GPC measurement, THF was used as the eluent. The evaluation results of the polymers (B-6), (B-7), and (B-8) are presented in Table 1.

(Synthesis Example 15) Synthesis of Polymer (B'-3)

The polymer (B'-3) was obtained in the same manner as Synthesis Example 4 except that the monomer composition having the composition presented in Table 1 was used. The yield of the polymer (B'-3) thus obtained was almost 100%. For the GPC measurement, DMF was used as the eluent. The evaluation results of the polymer (B'-3) are presented in Table 1.

Example 1

In a glass container, 16 parts of Kynar 761A (manufactured by Arkema Inc., PVDF homopolymer, trade names, Mw=550,000) as the membrane forming polymer (A), 12 parts of the polymer (B-1) as the polymer (B), and 72 parts of NMP (manufactured by Wako Pure Chemical Industries, Ltd., Wako special grade) as the solvent (C3) were blended and stirred for 10 hours at 50° C. using a stirrer, thereby preparing the membrane forming solution.

The membrane forming solution thus obtained was allowed to stand for one day at room temperature, subsequently coated on a glass substrate using a bar coater so as to have a thickness of 125 μm, thereby obtaining a coating film layered body. The coating film layered body was immersed in a coagulating bath containing 70 parts of deionized water and 30 parts of NMP as the coagulating bath solvent at room temperature.

The coating film layered body was allowed to stand in the coagulating bath for 5 minutes, and the coagulated product of coating film was then peeled off from the glass substrate and washed with hot water at 80° C. for 5 minutes to remove NMP, thereby fabricating the porous membrane having a flat membrane shape. The porous membrane having a flat membrane shape thus obtained was dried for 20 hours at 70° C., thereby obtaining a test piece of porous membrane having a thickness of 95 The contact angle of water on the outer surface of the test piece of porous membrane was 60°, and the average pore size was 60 nm. The evaluation results are presented in Table 2.

TABLE 2

| | | | Example 1 | Example 2 | Example 3 | Example 4 | Example 5 | Example 6 | Example 7 | Example 8 |
|---|---|---|---|---|---|---|---|---|---|---|
| Membrane forming solution | Polymer (A) | Kind | Kyner 761A | Kyner 761A | Kyner 301F | Kyner 761A | Kyner 761A | Kyner 761A | Kyner 761A | Kyner 761A |
| | | Content (parts) | 16 | 17 | 16 | 16 | 16 | 16 | 16 | 16 |
| | Polymer (B) | Kind | B-1 | B-1 | B-1 | B-1 | B-1 | B-2 | B-3 | B-4 |
| | | Content (parts) | 12 | 6 | 12 | 12 | 12 | 12 | 12 | 12 |
| | Solvent (C3) | Kind | NMP | NMP | NMP | DMF | DMAc | NMP | NMP | DMF |
| | | Content (parts) | 72 | 77 | 72 | 72 | 72 | 72 | 72 | 72 |

TABLE 2-continued

| Coagulating bath | Coagulating bath solvent | Kind | NMP | NMP | NMP | DMF | DMAc | NMP | NMP | DMF |
|---|---|---|---|---|---|---|---|---|---|---|
| | | Content (parts) | 30 | 30 | 30 | 30 | 30 | 30 | 30 | 30 |
| | Deionized water | Content (parts) | 70 | 70 | 70 | 70 | 70 | 70 | 70 | 70 |
| Evaluation results of porous membrane | | Contact angle (°) | 60 | 61 | 60 | 60 | 62 | 63 | 60 | 45 |
| | | Pore size (nm) | 60 | 68 | 77 | 55 | 57 | 90 | 53 | 32 |

| | | | Example 9 | Example 10 | Example 11 | Example 12 | Example 13 | Example 13 | Example 14 | Example 15 |
|---|---|---|---|---|---|---|---|---|---|---|
| Membrane forming solution | Polymer (A) | Kind | Kyner 761A | Kyner 761A | Kyner 761A | Kyner 761A | Kyner 761A | Kyner 761A | Kyner 761A | Kyner 762A |
| | | Content (parts) | 16 | 16 | 17 | 16 | 17 | 16 | 17 | 12 |
| | Polymer (B) | Kind | B-5 | B-6 | B-6 | B-7 | B-8 | B-8 | B-8 | B-6 |
| | | Content (parts) | 12 | 12 | 6 | 12 | 6 | 12 | 6 | 4 |
| | Solvent (C3) | Kind | DMAc | DMAc | DMAc | DMAc | DMAc | DMAc | DMAc | DMAc |
| | | Content (parts) | 72 | 72 | 77 | 72 | 77 | 72 | 77 | 84 |
| Coagulating bath | Coagulating bath solvent | Kind | DMAc | DMAc | DMAc | DMAc | DMAc | DMAc | DMAc | DMAc |
| | | Content (parts) | 30 | 30 | 30 | 30 | 30 | 30 | 30 | 0 |
| | Deionized water | Content (parts) | 70 | 70 | 70 | 70 | 70 | 70 | 70 | 100 |
| Evaluation results of porous membrane | | Contact angle (°) | 51 | 48 | 45 | 52 | 50 | 53 | 46 | 73 |
| | | Pore size (nm) | 48 | 38 | 50 | 36 | 68 | 31 | 49 | 45 |

The abbreviations in Table 2 indicate the following compounds, respectively.
Kynar 761A: PVDF homopolymer (manufactured by Arkema Inc., trade name, Mw=550,000)
Kynar 301F: PVDF homopolymer (manufactured by Arkema Inc., trade name, Mw=600,000)
NMP: N-methylpyrrolidone (manufactured by Wako Pure Chemical Industries, Ltd., Wako special grade)
DMF: N,N-dimethylformamide (manufactured by Wako Pure Chemical Industries, Ltd., special grade reagent)
DMAc: N,N-dimethylacetamide (manufactured by Wako Pure Chemical Industries, Ltd., Wako first grade)

Examples 2 to 15

The test pieces of porous membrane were obtained in the same manner as in Example 1 except that those presented in Table 2 were used as the membrane forming solution and the coagulating bath. The evaluation results thereof are presented in Table 2.

Example 16

The flux was measured using the test piece of porous membrane obtained in Example 15, and it was $2.21 \times 10^{-9}$ ($m^3/m^2/s/Pa$). In addition, the rejecting rate of the same test piece of porous membrane with respect to polystyrene fine particles of 0.132 μm was 99.9%.

Comparative Examples 1 to 6

The test pieces of porous membrane were obtained in the same manner as in Example 1 except that those presented in Table 3 were used as the membrane forming solution and the coagulating bath. The evaluation results thereof are presented in Table 3.

Comparative Example 7

The flux was measured using the test piece of porous membrane obtained in Comparative Example 6 in the same manner as in Example 16, and it was $1.43 \times 10^{-9}$ ($m^3/m^2/s/Pa$).

In addition, the rejecting rate of the same test piece of porous membrane with respect to polystyrene fine particles of 0.132 μm was 99.0%.

TABLE 3

| | | | Comparative Example 1 | Comparative Example 2 | Comparative Example 3 | Comparative Example 4 | Comparative Example 5 | Comparative Example 6 |
|---|---|---|---|---|---|---|---|---|
| Membrane forming solution | Polymer (A) | Kind | Kyner 761A | Kyner 761A | Kyner 301F | Kyner 761A | Kyner 761A | Kyner 762A |
| | | Content (parts) | 16 | 17 | 16 | 16 | 16 | 12 |
| | Polymer (B) | Kind | B'-1 | B'-1 | B'-1 | B'-1 | B'-2 | B'-3 |
| | | Content (parts) | 12 | 6 | 12 | 12 | 12 | 4 |
| | Solvent (C3) | Kind | NMP | NMP | NMP | DMF | NMP | DMAc |
| | | Content (parts) | 72 | 77 | 72 | 72 | 72 | 84 |

TABLE 3-continued

| | | | Comparative Example 1 | Comparative Example 2 | Comparative Example 3 | Comparative Example 4 | Comparative Example 5 | Comparative Example 6 |
|---|---|---|---|---|---|---|---|---|
| Coagulating bath | Coagulating bath solvent | Kind | NMP | NMP | NMP | DMF | NMP | DMAc |
| | | Content (parts) | 30 | 30 | 30 | 30 | 30 | 0 |
| | Deionized water | Content (parts) | 70 | 70 | 70 | 70 | 70 | 100 |
| Evaluation results of porous membrane | | Contact angle (°) | 75 | 78 | 76 | 76 | 82 | 83 |
| | | Pore size (nm) | 750 | 700 | 720 | 690 | 590 | 50 |

The abbreviations in Table 3 indicate the following compounds, respectively.
Kynar 761A: PVDF homopolymer (manufactured by Arkema Inc., trade name, Mw=550,000)
Kynar 301F: PVDF homopolymer (manufactured by Arkema Inc., trade name, Mw=600,000)
NMP: N-methylpyrrolidone (manufactured by Wako Pure Chemical Industries, Ltd., Wako special grade)
DMF: N,N-dimethylformamide (manufactured by Wako Pure Chemical Industries, Ltd., special grade reagent)
DMAc: N,N-dimethylacetamide (manufactured by Wako Pure Chemical Industries, Ltd., Wako first grade)

In Comparative Example 1, the polymer (B'-1) using MMA instead of the macromonomer (b1-1) was used, thus the average pore size of the porous membrane thus obtained was 750 nm to be great, and it was not possible to obtain a porous membrane suitable for obtaining a membrane exhibiting favorable fractionation performance and high water permeability.

In Comparative Example 2, the polymer (B'-1) using MMA instead of the macromonomer (b1-1) was used, thus the average pore size of the porous membrane thus obtained was 750 nm to be great and the contact angle of pure water thereon was 78° to be great, and it was not possible to obtain a porous membrane suitable for obtaining a membrane exhibiting favorable fractionation performance and high water permeability.

In Comparative Example 3, the polymer (B'-1) using MMA instead of the macromonomer (b1-1) was used and the kind of the polymer (A) was changed, but the average pore size of the porous membrane thus obtained was 700 nm to be great and the contact angle of pure water thereon was 76° to be great, and thus it was not possible to obtain a porous membrane suitable for obtaining a membrane exhibiting favorable fractionation performance and high water permeability.

In Comparative Example 4, the polymer (B'-1) using MMA instead of the macromonomer (b1-1) was used and the kind of the solvent (C3) of the membrane forming solution and the kind of the coagulating bath solvent were changed, but the average pore size of the porous membrane thus obtained was 690 nm to be great and the contact angle of pure water thereon was 76° to be great, and thus it was not possible to obtain a porous membrane suitable for obtaining a membrane exhibiting favorable fractionation performance and high water permeability.

In Comparative Example 5, the polymer (B'-2) using MMA instead of the macromonomer (b1-1) was used, but the average pore size of the porous membrane thus obtained was 590 nm to be great and the contact angle of pure water thereon was 82° to be great, and thus it was not possible to obtain a porous membrane suitable for obtaining a membrane exhibiting favorable fractionation performance and high water permeability.

In Comparative Example 6, the polymer (B'-3) using the controlled polymerization polymer (b'1-1) instead of the macromonomer (b1-1) was used, and the average pore size of the porous membrane thus obtained was 60 nm to be favorable but the contact angle of pure water thereon was 83° to be great, and thus it was not possible to obtain a porous membrane suitable for obtaining a membrane exhibiting favorable fractionation performance and high water permeability.

In addition, in Comparative Example 7, a test piece of porous membrane exhibiting a great contact angle of pure water of 83° was used, and thus the rejecting rate of the test piece of porous membrane with respect to polystyrene fine particles of 0.132 μm was 99.0% to be high but the flux of the test piece of porous membrane was $1.43 \times 10^{-9}$ (m$^3$/m$^2$/s/Pa) to be lower as compared to Example 15, and thus it was not possible to obtain a porous membrane for obtaining a membrane exhibiting high water permeability.

INDUSTRIAL APPLICABILITY

According to the invention, it is possible to obtain a polymer composition and a porous membrane suitable for obtaining a membrane exhibiting favorable fractionation performance and high water permeability by using a polymer easily obtained by a usual radical polymerization.

The invention claimed is:
1. A porous membrane formed from a resin composition containing:
a membrane forming polymer (A); and
a polymer (B) obtained by polymerizing a monomer composition containing a methacrylic acid macromonomer or methacrylate macromonomer (b1) represented by the following Formula (1)

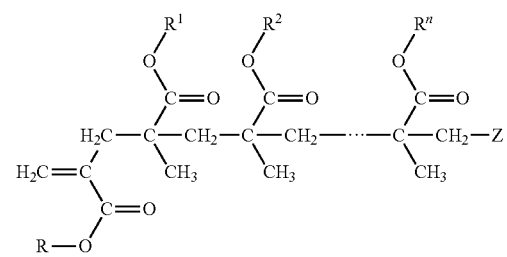

and other monomer (b2) which is a (meth)acrylic acid or (meth)acrylate,
wherein Formula (1),
R and $R^1$ to $R^n$ each independently represent a hydrogen atom, an alkyl group, a cycloalkyl group, an aryl group or a heterocyclic group,
Z is a terminal group, and
n is an integer from 2 to 10,000.

2. The porous membrane according to claim 1, wherein the membrane forming polymer (A) is a fluorine-containing polymer.

3. The porous membrane according to claim 1, wherein a contact angle of pure water on an outer surface of the porous membrane is 75° or less.

4. The porous membrane according to claim 1, wherein the porous membrane comprises pores having an average pore size of 500 nm or less.

5. The porous membrane according to claim 4, wherein the porous membrane comprises pores having an average pore size of 120 nm or less.

6. The porous membrane according to claim 1, wherein the polymer (A) is present in the porous membrane in an amount from 20 to 95 parts by mass with respect to 100 parts by mass of the total amount of the polymer (A) and the polymer (B).

7. The porous membrane according to claim 1, wherein the polymer (B) is present in the resin composition in an amount from 1 to 50 parts by mass with respect to 100 parts by mass of the total amount of the polymer (A) and the polymer (B) in the resin composition.

8. The porous membrane according to claim 1, wherein the macromonomer (b1) is present with respect to 100 parts by mass of the total amount of the macromonomer (b1) and the other monomer (b2) in an amount from 5 to 99 parts by mass.

9. The porous membrane according to claim 8, wherein the macromonomer (b1) is present with respect to 100 parts by mass of the total amount of the macromonomer (b1) and the other monomer (b2) in an amount from 50 to 95 parts by mass.

10. The porous membrane according to claim 1, wherein a number average molecular weight (Mn) of the polymer (B) is 1,000 to 5,000,000.

11. The porous membrane according to claim 1, wherein a number average molecular weight of the macromonomer (b1) is from 1,000 to 1,000,000.

12. The porous membrane according to claim 11, wherein the number average molecular weight of the macromonomer (b1) is from 8,000 to 38,000.

13. The porous membrane according to claim 1, wherein a molecular weight distribution (a mass average molecular weight (Mw)/a number average molecular weight (Mw)) of the macromonomer (b1) is 1.5 or more and 5.0 or less.

14. The porous membrane according to claim 1, wherein a flux of pure water is $1.0 \times 10^{-10}$ ($m^3/m^2/s/Pa$) or more.

15. The porous membrane according to claim 1, wherein the monomer (b2) is at least one selected from the group consisting of methyl methacrylate, methoxy-diethylene glycol methacrylate, methoxy-nonaethylene glycol methacrylate, 2-hydroxyethyl methacylate, 2-hydroxyethyl acrylate and methacrylic acid.

\* \* \* \* \*